(12) United States Patent
Oehninger

(10) Patent No.: US 7,654,192 B2
(45) Date of Patent: Feb. 2, 2010

(54) COFFEE AUTOMAT HAVING A VERTICALLY ADJUSTABLE AND LOCKABLE OUTFLOW UNIT

(75) Inventor: Max Oehninger, Stäfa (CH)

(73) Assignee: Eugster/Frismag AG, Romanshorn (CH)

( * ) Notice: Subject to any disclaimer, the term of this patent is extended or adjusted under 35 U.S.C. 154(b) by 66 days.

(21) Appl. No.: 11/488,993

(22) Filed: Jul. 19, 2006

(65) Prior Publication Data
US 2007/0017376 A1    Jan. 25, 2007

(30) Foreign Application Priority Data
Jul. 21, 2005    (DE)    .................. 20 2005 011 476 U

(51) Int. Cl.
*A47J 31/00*    (2006.01)

(52) U.S. Cl. ........................................ 99/280; 99/323

(58) Field of Classification Search ........... 99/279–323, 99/452–455, 495, 275–277; 392/448; 219/492, 219/511
See application file for complete search history.

(56) References Cited

U.S. PATENT DOCUMENTS

| | | | |
|---|---|---|---|
| 5,992,298 A | | 11/1999 | Illy et al. |
| 6,843,165 B2 * | | 1/2005 | Stoner .......................... 99/295 |
| 6,883,685 B2 * | | 4/2005 | Jones et al. ............... 222/146.5 |
| 6,990,891 B2 * | | 1/2006 | Tebo, Jr. ....................... 99/295 |
| 6,994,015 B2 * | | 2/2006 | Bruinsma .................. 99/289 R |
| 7,079,074 B2 * | | 7/2006 | Bierwisch et al. ....... 342/357.06 |
| 7,213,505 B2 * | | 5/2007 | Kollep ........................... 99/281 |
| 7,237,475 B2 * | | 7/2007 | Chen et al. ................. 99/302 R |
| 7,255,039 B2 * | | 8/2007 | Halliday et al. ............... 99/295 |
| 7,281,467 B2 * | | 10/2007 | Cai ............................... 99/293 |
| 7,316,178 B2 * | | 1/2008 | Halliday et al. ............... 99/295 |

FOREIGN PATENT DOCUMENTS

| | | |
|---|---|---|
| DE | 298 10 291 | 10/1998 |
| DE | 200 17 859 | 4/2002 |
| DE | 102 39 595 | 3/2004 |
| DE | 202 20 056 | 5/2004 |
| EP | 1 563 775 | 8/2005 |

* cited by examiner

*Primary Examiner*—Timothy F. Simone
(74) *Attorney, Agent, or Firm*—William L. Androlia; H. Henry Koda

(57) ABSTRACT

In a coffee automat, a vertically adjustable and lockable outflow unit (3), which comprises at least one coffee outflow tube (6) in fluid-conductive connection with a coffee brewing device is continuously height-adjustable relative to a cup base and can be locked by a locking means. In order to easily and smoothly adjust, in a coffee automat rationally to be manufactured, the outflow unit (3) with the locking means released, the outflow unit (3) is supported on housing (1) by means of a longitudinal ball bearing (12) as a first bearing element, which embraces a vertical longitudinal ball bearing shaft (13) as a second bearing element. One of the two bearing elements is connected with outflow unit (3) and the other of the two bearing elements is in solid connection with a housing (1) of the coffee automat.

19 Claims, 9 Drawing Sheets

COFFEE AUTOMAT HAVING A VERTICALLY ADJUSTABLE AND LOCKABLE OUTFLOW UNIT

BACKGROUND OF THE INVENTION

1. Field of the Invention

The present invention relates to a coffee automat having a vertically adjustable and lockable outflow unit.

2. Description of the Related Art

By means of such prior art coffee automats, various coffee preparations can be selected for which different portions, or liquid amounts, respectively, are typical and for which, therefore, differently sized cups have to be used. Cups for espresso, for instance, are distinctly smaller, particularly less high, than are coffee pots or cups for cappuccino. For large coffee portions, mugs can be used. In order to obtain a very precise inflow of the coffee preparation into the vessels of different size, particularly height, prior art coffee automats include already an outflow unit vertically adjustable with respect to the size, particularly the height, of the receiving vessel, above a vessel support, or cup support, respectively. For the height adjusting support of the outflow unit, a groove and tongue shift arrangement is provided as a rule. The outflow unit may, in addition, include a clamping means in order to lock the adjusted outflow height.—Unless produced very precisely and at high costs, such groove and tongue shift arrangements may be adjustable with a lot of difficulties only or may include a large play. In combination with the clamping means the require attention and a certain skill for adjustment and safe locking. In operation, they do not impart a very valent impression.

Technically highly sophisticated is also a prior art drinks dispenser, particularly a coffee automat of the kind referred to in the beginning including an outflow means for the beverage and a cup support wherein a height distance between an outflow portion, or an outflow unit, respectively, and the cup support is continuously adjustable and lockable by a locking means which is in operative connection with a movable part on one hand, and a fixed part of the drinks dispenser, on the other, wherein the movable part, adjacent to the fixed part, includes two sliding coulisses horizontally spaced in parallel relative to each other, each of which being height-adjustable in a slider (DE 298 10 291.9 A). In detail, each sliding coulisse is approximately U-shaped having an inner leg and an outer leg, and each slider constitutes a sliding angle having two legs the first leg of which forming a solid unit with the fixed portion and at least one section of the second leg is embraced by the inner leg and the outer leg of the sliding coulisse. For locking, the outer legs of the sliding coulisse may include, on its fixed outer side facing the fixed portion, a stripe of ferromagnetic material and facing it, a magnet is provided on the fixed portion. Analogously and vice versa, the outer legs of the sliding coulisse may include, on their outer side facing the fixed part, the magnet facing same the strip of ferromagnetic material is solidly fastened to the fixed part whereof.

BRIEF SUMMARY OF THE INVENTION

It is therefore the aim of the present invention to further develop a rationally producible coffee automat including a vertically adjustable and lockable outflow unit of the kind referred to in the beginning so that the outflow unit, with the locking means disengaged, may precisely and easily be adjusted.

For the coffee automat, this problem is solved based on the features of the first aspect of the present invention.

In this way, a friction and wear resistant support of the outflow unit is obtained on the housing of the coffee automat by means of a longitudinal ball bearing as the first support element which comprises a vertical longitudinal ball bearing shaft as the second support element so that the outflow unit can easily be adjusted and subsequently locked. One of the two first and second support elements is connected with the outflow unit and the other of the two support elements is in solid connection with the housing. Two compact variants of this support arrangement are revealed in the second and third aspects of the present invention. In the vertical adjustment, the outflow unit can simply and reliably be locked by means of at least two looking elements according to the eighth aspect of the present invention, a first one of which being connected to the outflow unit, particularly the installation chassis, and the second is provided on a housing of the coffee automat. The coffee automat having such a vertically adjustable and lockable outflow unit may, in addition, esthetically be particularly appealing and impart the impression of a valent haptic.

In particular, the magnetic field of a holding magnet in which the ferromagnetic locking element is disposed can uncomplicatedly and directly be used, according the eighth aspect of the present invention, for the generation of an adhesive force between the outflow unit and the housing of the coffee automat.

In an embodiment according to the tenth aspect of the present invention, it is possible instead to adjust the installation chassis as an integral part of the outflow unit by means of a driving motor via a toothed rack and a gear connection. Locking of the outflow unit adjusted to a corresponding cup height can be obtained, in case of a self-locking make of the driving motor with the gear connection, by simply switching off the driving motor, i.e. no particular manipulation is necessary.—The gear connection includes a gear and, according to the eleventh aspect of the present invention, particularly a driving pinion connected with the driving motor and meshing with the toothed rack.

In the area of the vertically adjustable and lockable outflow unit, the coffee automat is furthermore shaped, according to the second through seventh aspects of the present invention, in a particularly suitable form.

According to the second aspect of the present invention, the longitudinal ball bearing shaft is vertically provided on a support which, on its part, is connected with the housing of the coffee automat. The housing of the coffee automat need not, therefore, be worked on for mounting the longitudinal ball bearing shaft, except for the provision of the support. In addition, the support may be provided on the housing in a way that it can easily be changed.

According to the fourth aspect of the present invention, the installation chassis of the outflow unit is provided with a vertical wall which separates a space in which the coffee outflow tube and a section of a coffee inflow duct connected therewith are disposed from a further space in which the longitudinal ball bearing and a locking element, or a drive element for the height adjustment of the installation chassis are disposed. In this way, the installation chassis can directly cooperate with a further locking element, or a drive element, respectively, which are protected against the outside.

In the embodiment according to the fifth aspect of the present invention, a horizontal wall section projects from the first side of the installation chassis, which carries the coffee outflow tube.

Instead of a coffee outflow tube, at least two outflow tubes may be provided at this place as well which, spaced relative to each other, project below from an outflow distributor while the outflow distributor is carried by the horizontal wall section.

The longitudinal ball bearing is protectedly and mechanically stably disposed in a projection projecting from the second side of the installation chassis. At this projection, either the locking means may engage or a locking element may be provided.

According to the seventh aspect of the present invention, the installation chassis has a smooth surface and is hygienically closed by a cap which substantially covers the installation chassis with the exception of the side facing the housing of the coffee automat, or the support, respectively, so that the connection of the installation chassis to the elements of height adjustment, or locking, respectively, disposed on, or within, the housing of the coffee automat, is ensured.

In the above-mentioned embodiment of the locking means according to the eighth aspect of the present invention, wherein a holding magnet is provided as one of the two locking elements and having a ferromagnetic second locking element, the holding magnet is preferably provided, according to the ninth aspect of the present invention, limitedly movable in horizontal direction, in a recess of the installation chassis, particularly in the projection of the installation chassis. The ferromagnetic locking element cooperating with the holding magnet provided on the housing, which faces substantially the holding magnet may suitably be realized by the support of the longitudinal ball bearing shaft provided on the housing. For height adjustment, the outflow unit may manually be gripped and either lifted or lowered whereby the holding magnet glides on the ferromagnetic locking element with a defined friction but does not lock because it is horizontally movable. When letting the outflow unit go, it will, without any difficulties safely be held by the adhesive force between the holding magnet and the ferromagnetic locking element.

In the above-mentioned adjustment device and the locking means including a driving motor which is connected with the installation chassis via a gear connection, there is provided, according to the tenth aspect of the present invention, a vertical toothed rack at the installation chassis, preferably at the above-mentioned projection on the second side of the vertical wall of the installation chassis where it can, without any difficulties mesh with a gear connection to the driving motor, or a driving pinion, respectively.

In the formation of the locking means including the holding magnet and the opposite ferromagnetic locking element solidly disposed on the housing, height adjustment may simply and sensibly be performed manually by manipulating the outflow unit, considering that the holding magnet in combination with the opposite ferromagnetic locking element, constantly generates sufficient adhesive friction to be able to lock the outflow unit at any adjusted height. This applies also to manufacturing tolerances since the holding magnet is arranged limitedly movable in horizontal direction whereby a tolerance compensation is obtained. Manual adjustment, on the other hand, of the outflow unit is therefore ensured in case of a suitable magnetic field strength of the holding magnet which constantly abuts against the ferromagnetic locking element.—When forming the locking means and the height adjustment with a driving motor and a gear connection to the installation chassis, height adjustment may be even more comfortably obtained by actuating an up-down switch according to the twelfth aspect of the present invention, or a starter switch for coffee according to the nineteenth aspect of the present invention.

By the up-down switch according to the twelfth aspect of the present invention, and in combination with the limit switches according to the thirteenth aspect of the present invention, the direction is controlled in which the outflow unit is adjusted until the driving motor, by switching the up-down switch, or automatically on reaching the actual cup height, is switched off. This will later be explained in more detail.

The limit switches may be disposed, according to the fourteenth aspect of the present invention, as head contact or foot contact in the movement path of the installation chassis in order to effect that the driving motor starts in the correct sense of rotation for the vertical adjustment of the outflow unit in order to move the outflow unit from the respective end position.

Instead of the limit switches, a displacement encoder may be provided which is coupled, according to the fifteenth aspect of the present invention, to the driving motor and senses whether or not the upper end position or the lower end position of the outflow unit has been reached. The encoder may also control the direction in which the outflow unit moves out from one of the two end positions until the outflow unit, particularly when reaching the respective cup height, is stopped.

Particularly friendly in operation, since operator's attention is not required for stopping the outflow unit when reaching the respective cup height, the coffee automat may be equipped, according to the sixteenth aspect of the present invention, with a sensor unit at the outflow unit by which the height of a cup placed under the outflow tube is sensed and the driving motor which moves the outflow unit particularly from an upper end position is automatically switched off as soon as the sensor arrangement determines the height of the cup.

According to the seventeenth and eighteenth aspects of the present invention, the sensor arrangement may alternatively be provided as a light barrier system or as laser approximation or reflex system.

For automatically switching off the height adjustment of the outflow unit by means of the sensor unit, the switching arrangement according to the nineteenth aspect of the present invention has been provided. It comprises a relay which can be switched on by a starter switch. The starter switch may particularly be the switch initiating the brewing of the coffee. The relay actuates switch-over contacts disposed in the current path of the driving motor wherein the end contacts as well as a light barrier contact, or laser barrier contact, respectively, are disposed in a way that by actuating the starter switch, the outflow unit will move down from an upper end position down to the cup height, will stop when sensing the cup height by the respective sensor arrangement since the light barrier contact, or the laser barrier contact, respectively, is actuated, particularly opened thereby, and after the termination of the brewing process or removal of the cup, moves back into the upper end position by opening the starter switch, particularly because the current flow via the relay contacts shaped as two-way contacts and the head contact, or the respective end switch, respectively, is reversed.—It should be noted that when opening the starter switch for newly adjusting the outflow unit, a brewing water pump of the coffee automat is simultaneously switched off in order to avoid that the coffee preparation flows out of the outflow unit uncontrolled.

It is particularly useful if the circuit arrangement in which the driving motor is arranged, is enlarged, according to the twentieth aspect of the present invention, by a further sensor, or a sensor contact controlled by it, respectively, which senses, or controls, the presence of a cup placed under the outflow tube so that wrong handling of the height adjustment is excluded. This sensor is particularly arranged in series relative to the starter switch and to the relay. If there is no cup under the outflow duct, the sensor switch effects that the current path of the driving motor is not closed and it remains in its end position. In addition, it can prevent a brewing process.

BRIEF DESCRIPTION OF THE SEVERAL VIEWS OF THE DRAWINGS

In the following, four embodiments of the present invention will be explained in more detail, based on a drawing including ten figures from which further details of the invention and clarifications can be taken, and wherein.

In the figures, corresponding parts of the various embodiments have identical reference numerals.

DETAILED DESCRIPTION OF THE INVENTION

Figure 1:
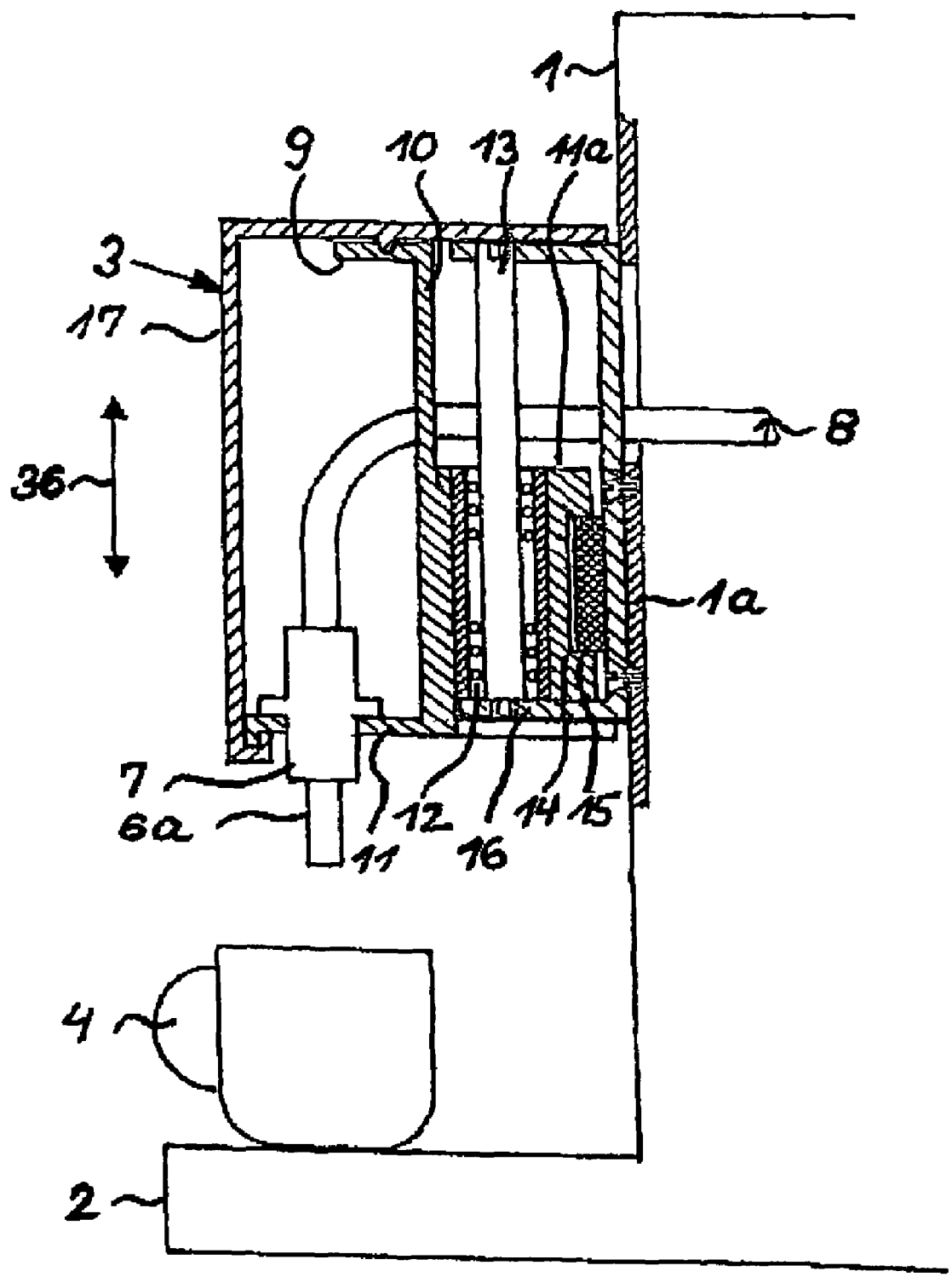
FIG. 1 shows a horizontal section through a first embodiment of a coffee automat, particularly having a directly manually vertically adjustable outflow unit having a holding magnet.

In FIGS. 1 through 9, reference numeral 1 refers to a housing of an espresso machine comprising a base 2 on which, below an outflow unit 3, cups of various sizes, for instance a small cup 4 or a large cup 5 can be placed. In FIGS. 3 through 8, the larger cup is shown in broken lines. The cups are placed on base 2 so that they completely take up brewed coffee from coffee outflow tubes 6, 6a on a coffee outflow distributor. The amount of brewed coffee leaving coffee outflow tubes 6 can be adjusted by means not shown.—Coffee outflow tubes 6, 6a and coffee outflow distributor 7 belong to outflow unit 3 through which a flexible coffee in-flow duct 8 leads to outflow distributor 7 from a brew unit not shown in housing 1. The brew unit includes also a brewing water pump not shown which is switched on for brewing the coffee. For switching on, starter switch 19 for coffee is used.

The structure of outflow unit 3 supporting outflow distributor 7 including coffee outflow tubes 6, 6a, constitutes an installation chassis 9 having a vertical wall 10 from the first side of which a horizontal wall section 11 is projecting which supports outflow distributor 7 including coffee outflow tubes 6, 6a. On the side averted from the first side of vertical wall 10, a projection 11a from the wall is formed which faces housing 1 of the espresso machine. In a bore of projection 11, a vertically movable longitudinal ball bearing 12 is disposed. Longitudinal ball bearing 12 includes a fixed longitudinal ball bearing shaft 13 along which it can easily be moved.

On the side of projection 11 a facing housing 1 of the first embodiment according to FIG. 1, a holding magnet 15 is fitted into an open recess 14 in a way that holding magnet 15 can horizontally be moved in a limited way to make tolerance compensation possible so that holding magnet 15, independently from its height adjustment can safely adhere to a counter piece of ferromagnetic material and thus can lock the outflow unit.

The counter piece is a carrier 16 of ferromagnetic material, which is solidly connected with housing 1 in that it is screwed for instance to a counter plate 1a behind a wall of housing 1. Hence, carrier 16 serves in connection with holding magnet 15 as a locking element.

Between legs, not marked, of the carrier which is approximately C-shaped, the longitudinal ball bearing shaft 13 is stationarily secured.

From FIG. 1, it can be taken that housing 1 of the espresso machine and counter plate 1a include a slit through which the flexible coffee inflow duct 8 is guided from the brew unit, or the brewing head, respectively, in housing 1 to coffee outflow distributor 7.

The structural unit of carrier 16 and of installation chassis 9 is closed by a cover cap 17 to constitute a flat face.

Figure 2:
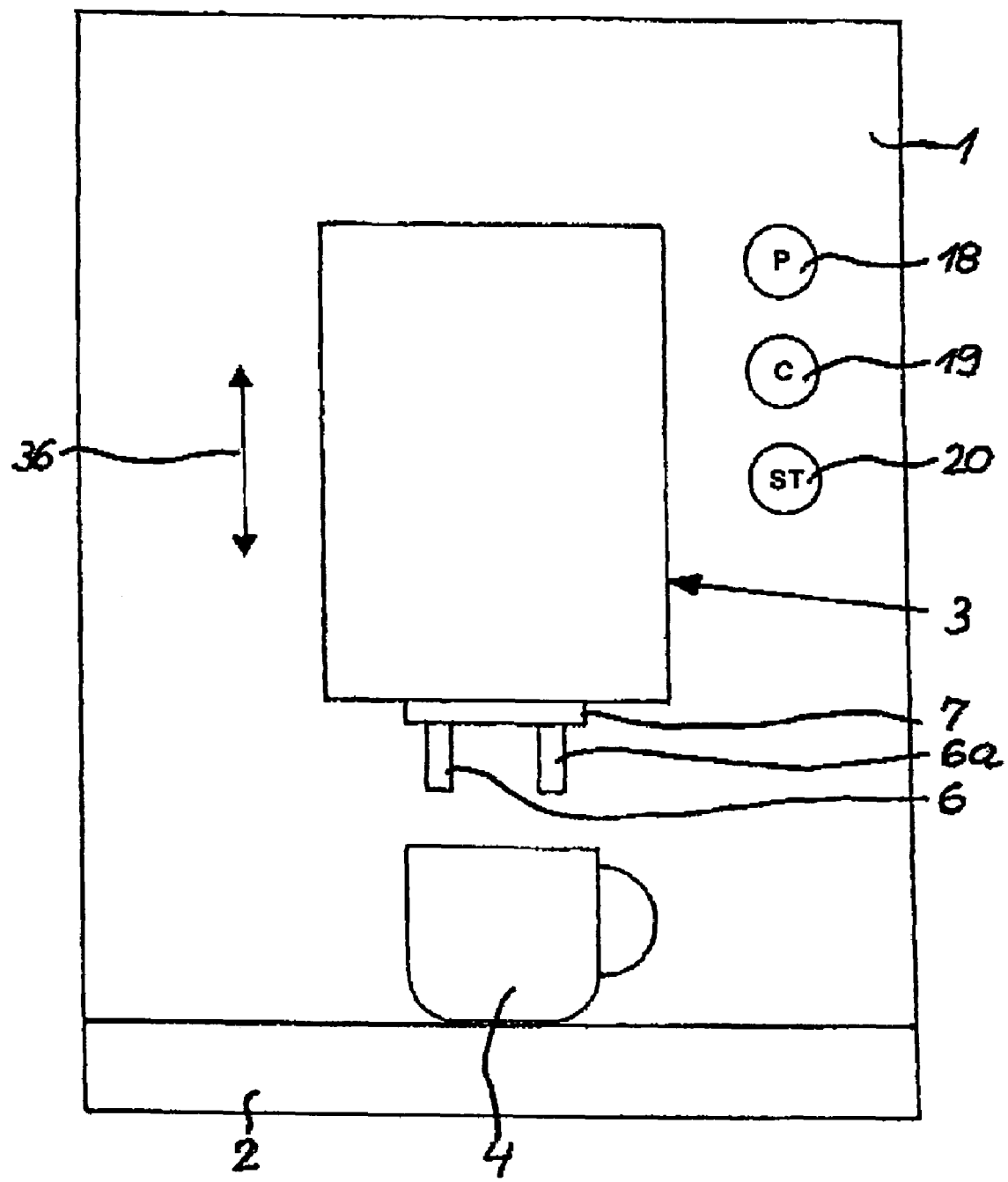
FIG. 2 shows a front view of the first embodiment according to FIG. 1.

FIG. 2 shows three control buttons of the espresso machine, namely a mains switch 18, a starter switch for coffee 19 and a starter button 20 for steam.

Prior to a brewing process and after placing cup 4 on base 2, outflow unit 3 is manually adjusted to a height so that coffee flowing from coffee outflow tubes 6, 6a after actuating starter switch 19 for coffee will completely and safely be taken up by cup 4. Double arrow 36 shown in FIGS. 1 through 8 shows the height adjustability of the outflow unit in both directions. In the position of outflow unit 3 shown in FIG. 1, it takes its lowest position where an upper horizontal section of covering cap 17 rests on carrier 16. From this position, outflow unit 3 can without any difficulties be moved upward after overcoming the adhesive force of holding magnet 15, while after releasing the outflow unit, holding magnet 15 holds the outflow unit safely in the position adjusted.

The second embodiment according to FIGS. 3 and 4 with outflow unit 3a differs from the above first embodiment according to FIGS. 1 and 2 substantially in the following:

On the side of vertical wall 10a of an installation chassis 9a, facing housing 1 of the espresso machine, a toothed rack 21 is in solid connection with a projection 11a of the wall. Toothed rack 21 serves as an element for vertical adjustment and for locking. For an easy and wear-resistant height adjustment, the longitudinal ball bearing is disposed in projection 11a which in this way is in solid connection with installation chassis 9a. It embraces a longitudinal ball bearing shaft 13a for easy and wear-resistant height adjustment. The vertical longitudinal ball bearing shaft 13a is fixed to a carrier 16a which, on its part, is screwed to housing 1 of the espresso machine, or a counter plate 1a, respectively.

At the two ends of the movement path of the toothed rack, two limit switches, namely a head contact 22 and a foot contact 23 are disposed. They are formed as openers, i.e. they are normally closed, but are opened if the toothed rack is in its respective end position, as for instance shown in FIG. 3 at head contact 22.

For height adjustment, a drive motor 24 connected via a gear 35 and a driving pinion 25 with toothed rack 21 into which driving pinion 25 engages is provided in housing 1.

Figure 3:
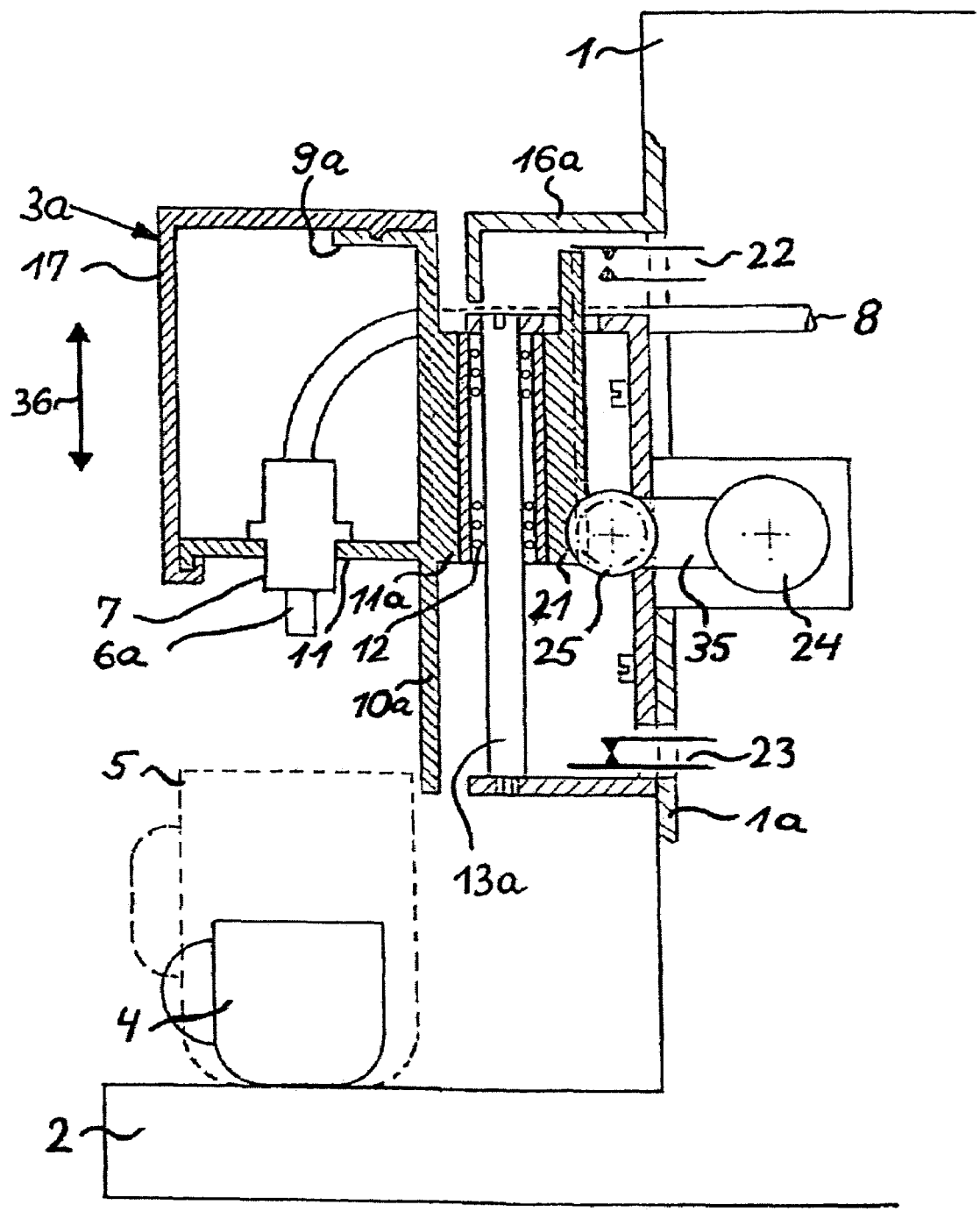
FIG. 3 shows a horizontal section through a second embodiment of the coffee automat having a manually controlled outflow unit vertically adjustable by a motor.
Figure 4:
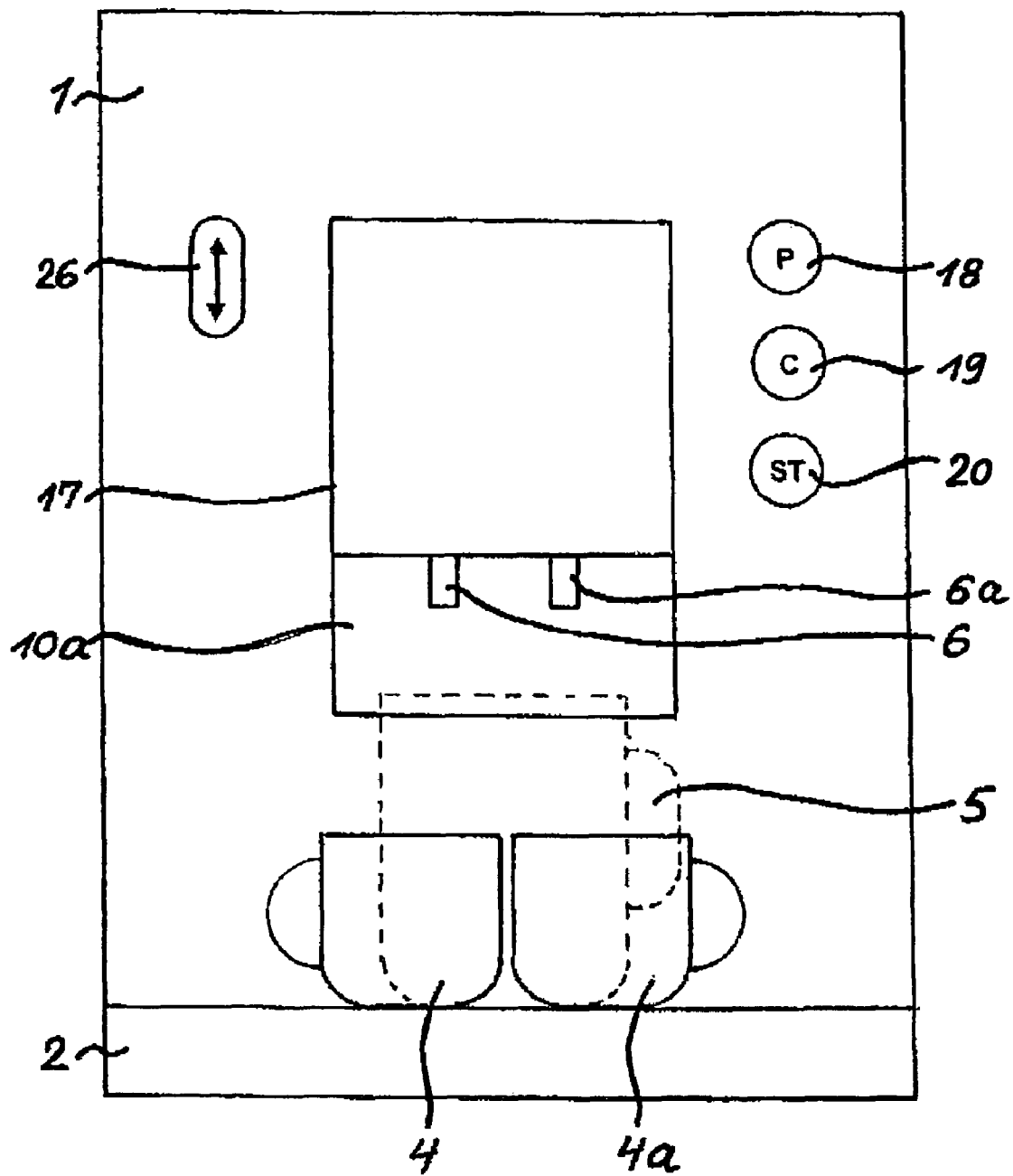
FIG. 4 shows a front view of the second embodiment according to FIG. 3.
Figure 9:
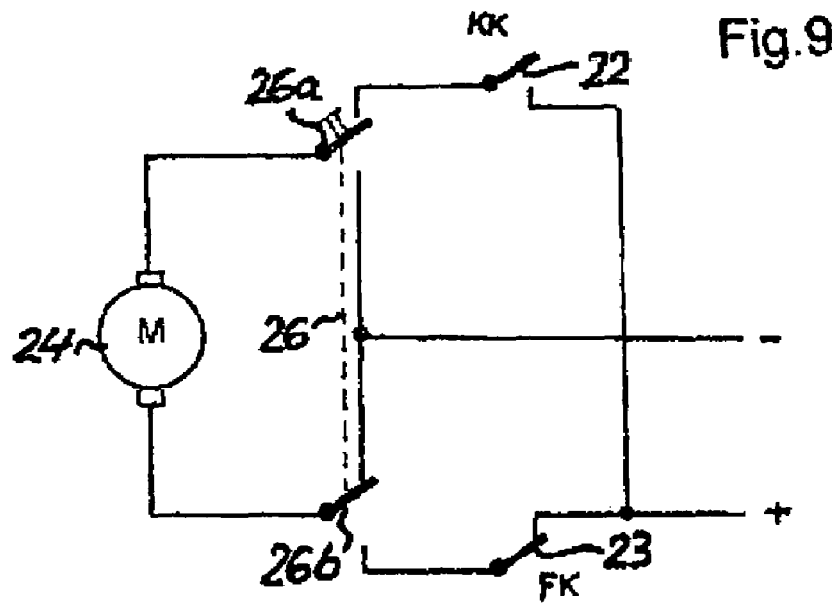
FIG. 9 shows a basic circuitry diagram of the second embodiment.

Control of drive motor 24 is effected, in the embodiment according to FIGS. 3 and 4, by means of an up-down switch 26 provided as a two-pole switch as shown in the respective circuitry diagram in FIG. 9. From this circuitry diagram, the insertion of head contact 22 and foot contact 23 can be taken as well.

In the situation shown in FIGS. 3 and 9, outflow unit 3a is in its upper position in which toothed rack 21 opens head contact 22 while foot contact 23 is closed. In the circuit position shown in FIG. 9 of up-down switch 26, drive motor 24 is without voltage. When up-down switch 26 is actuated from this switch position, current flows via foot contact 23, a contact 26b of up-down switch 26, the motor 24 and a second contact 26a of up-down switch 26. Therefore, drive motor 24 moves, via gear 35 and pinion 25, the toothed rack and together with it the complete outflow unit 3a in downward direction toward a large cup 5 or a small cup 4 placed underneath until the operator switches up-down switch 26 back into the position shown in FIG. 9 thus interrupting current flow via motor 24. If there is no such switch-over during the lowering of outflow unit 3a, drive motor 24 is switched off when toothed rack 21 reaches its end position and opens foot contact 23. Head contact 22 is already closed as soon as the upper side of toothed rack 21 has left the head contact, whereby in case of renewed actuation of the up-down switch when it reaches the position shown in FIG. 9, the circuit arrangement is prepared to feed current to drive motor 24 so that outflow unit 3a moves back in upward direction up to its upper end position. (The upper end position will not be reached if up-down switch 26 is actuated beforehand so that its movement is stopped.)

In case of a currentless drive motor 2, outflow unit 3a will automatically lock since the arrangement of motor, gear, pinion, toothed rack is self-locking.

The second embodiment according to FIGS. 3, 4 and 9 is thus suited to make height adjustment of outflow unit 3a easier since it requires only one actuation of the up-down switch and the observation of the height adjustment with a view to the cup placed underneath.

A higher automation degree of height adjustment is obtained by means of the embodiments according to FIGS. 5 through 8 and 10. Both with the third embodiment according to FIGS. 5 and 6 and with the fourth embodiment according to FIGS. 7 and 8, height adjustment and subsequent locking occurs automatically after actuating starter switch 19 for coffee when a cup 4, or 5, respectively, is placed on base 2.

Figure 5:
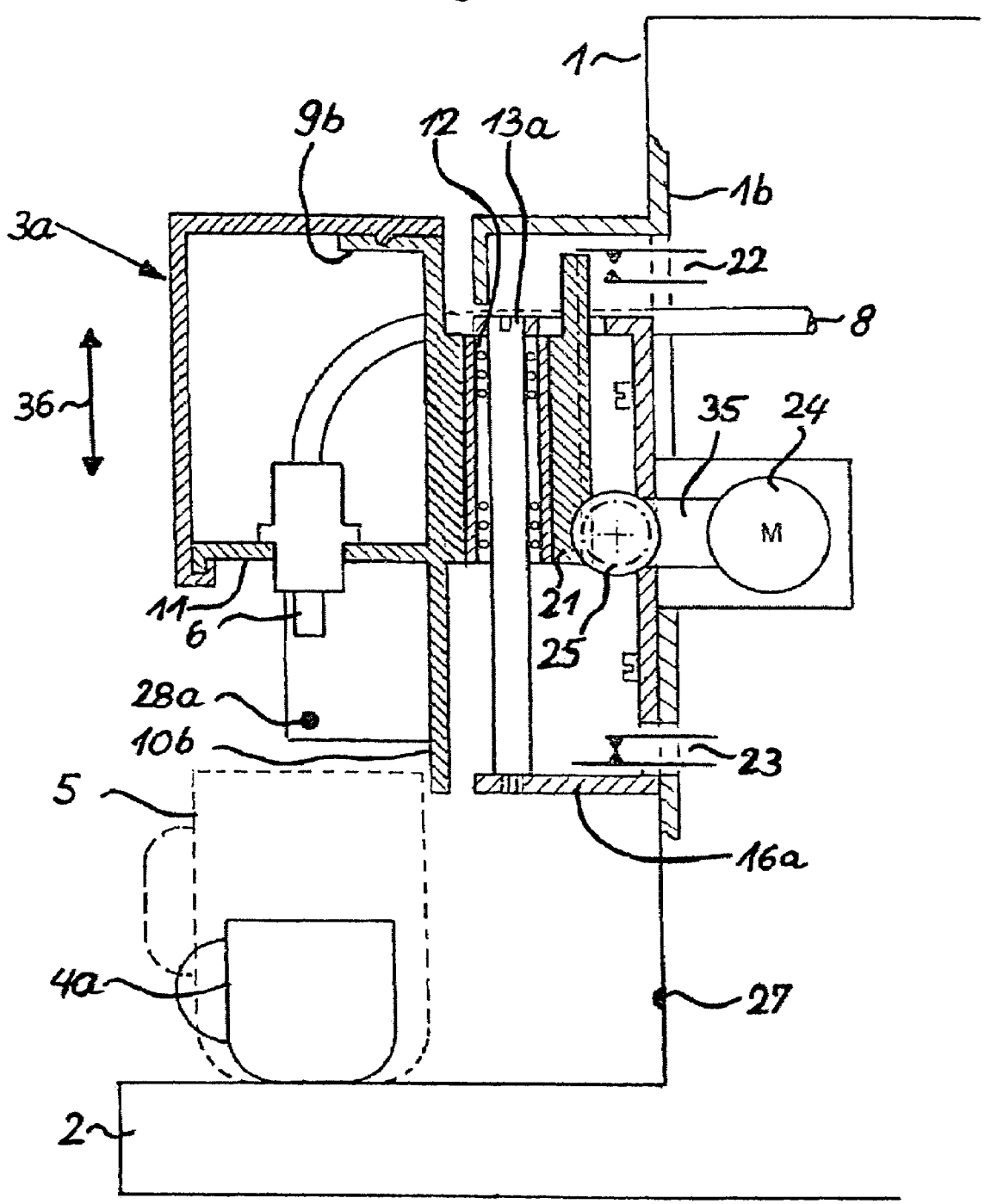
FIG. 5 shows a vertical section through a third embodiment of an outflow unit automatically vertically adjustable by a motor and including a sensor arrangement engaged in height adjustment.

To this end, the third embodiment according to FIG. 5 includes, in the radius of action of cup 4, or 5, respectively, in housing 1 of the espresso machine, a first stationary sensor 27 and, on outflow unit 3a, a light barrier adjustable with it including light barrier elements 28, 28a. The latter are disposed at a lower section of outflow unit 3a so that a beam of rays passing between them is interrupted by the upper edge of cup 4, or 5, respectively. A sensor contact belonging to cup sensor 27 is designated, in FIG. 10, by reference numeral 29, and a light barrier contact belonging to light barrier 28, 28a bears reference numeral 30.

Figure 7:
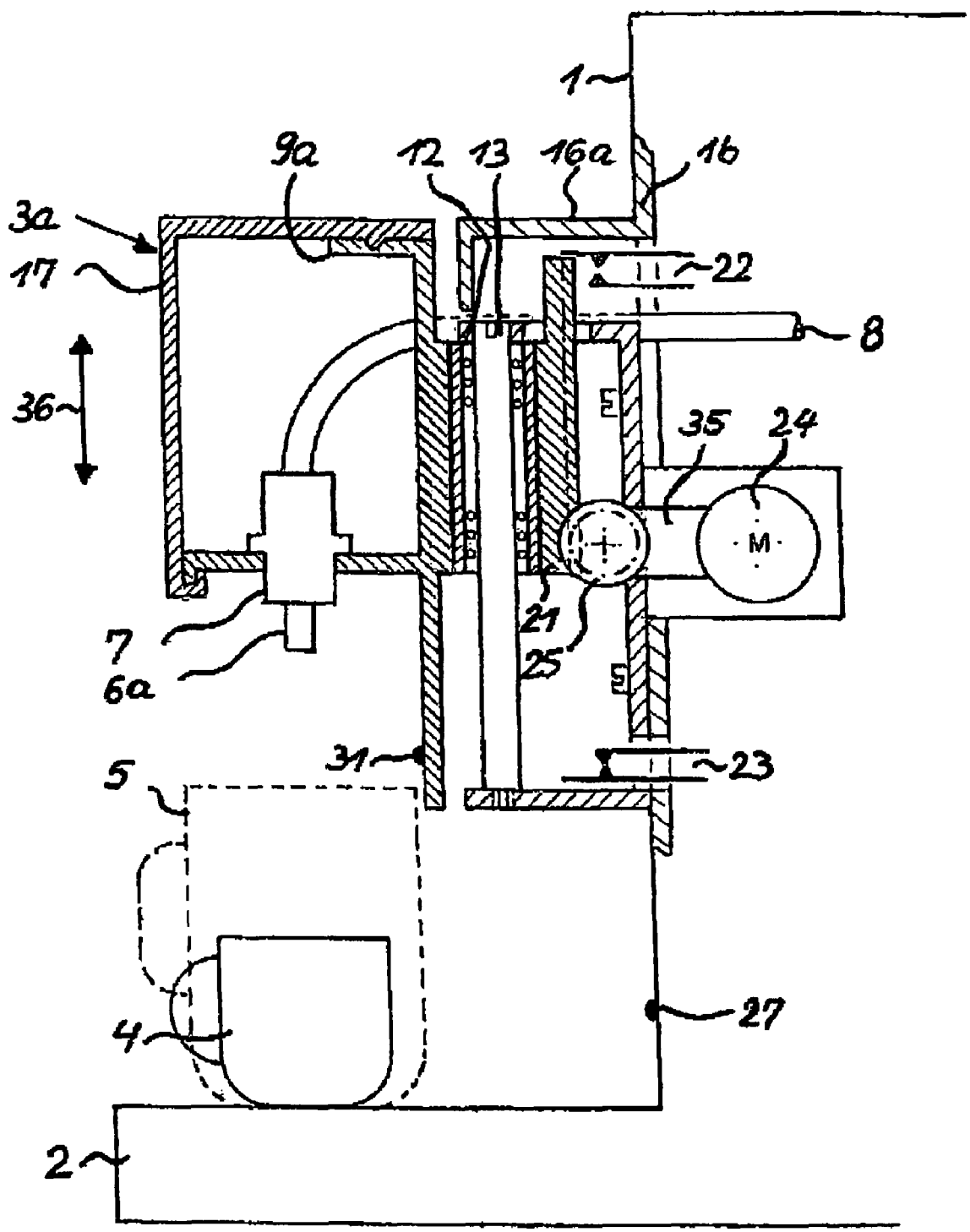
FIG. 7 shows a vertical section through a fourth embodiment of the outflow unit as a variant of the third embodiment having an alternative sensor arrangement engaging in height adjustment.
Figure 8:
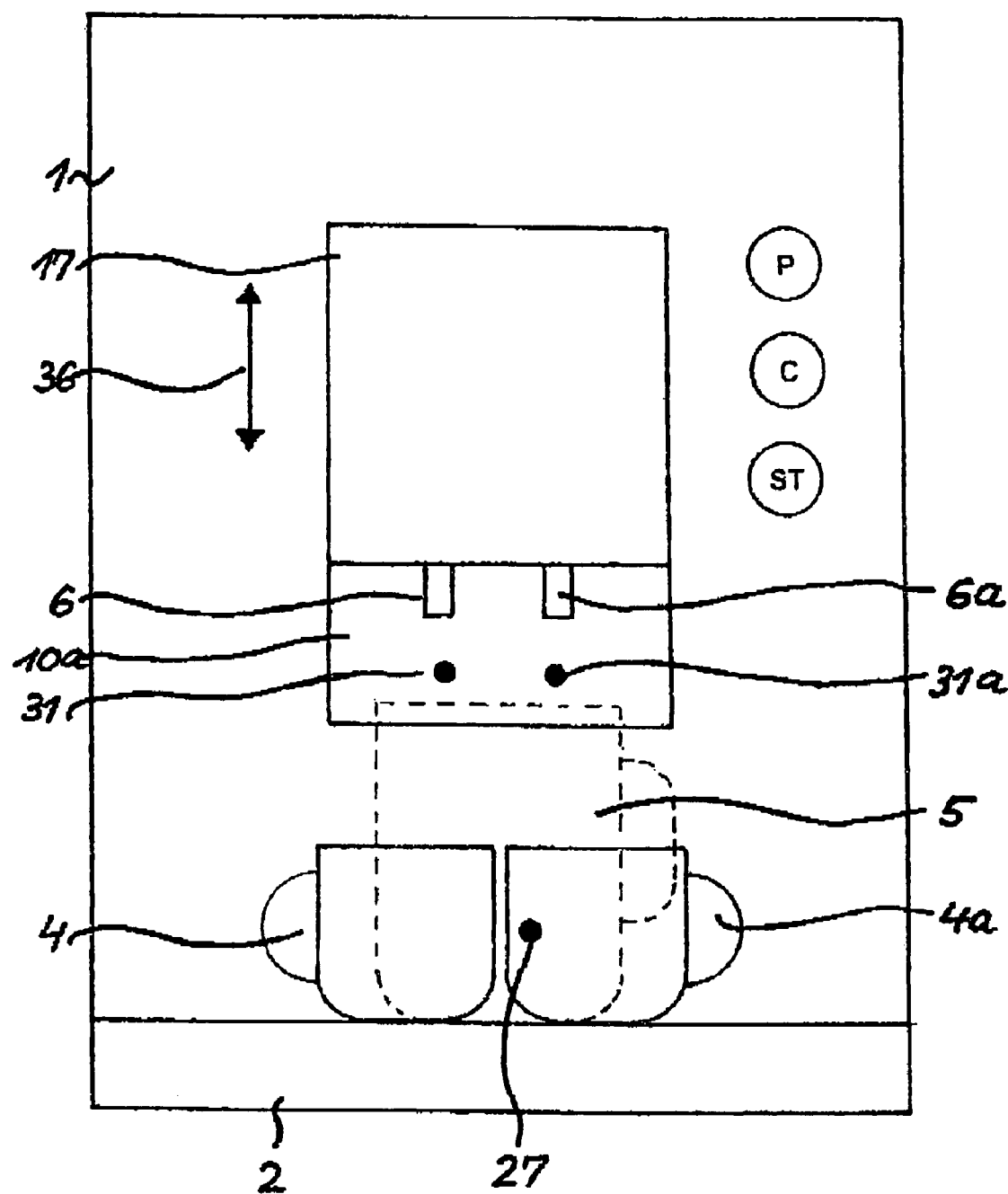
FIG. 8 shows a front view of the fourth embodiment according to FIG. 7.
Figure 10:
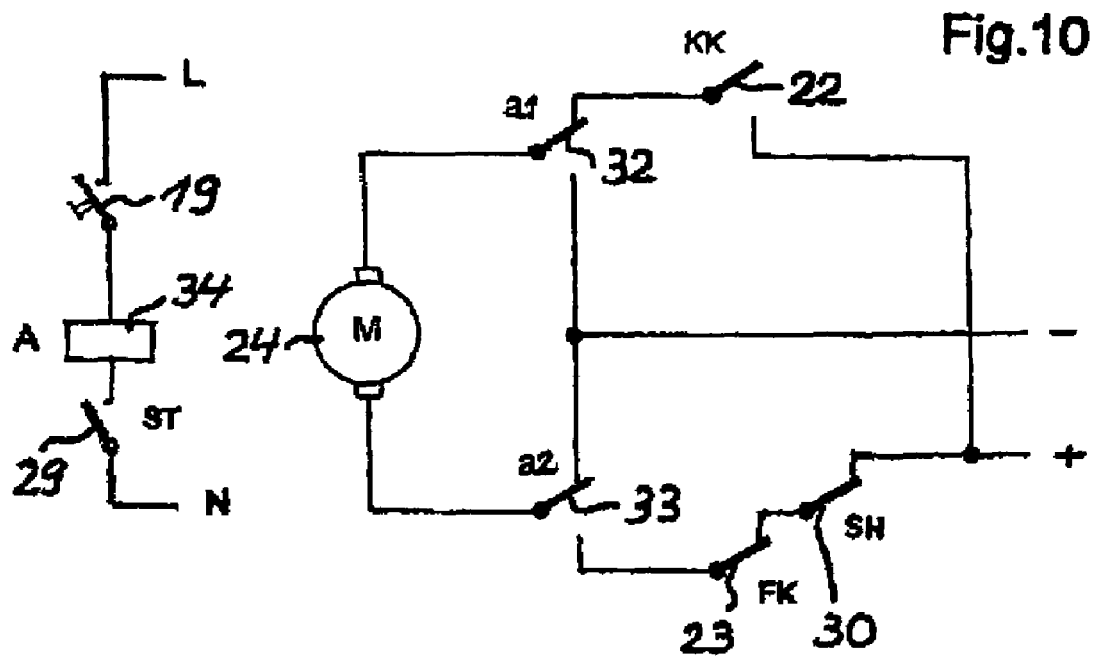
FIG. 10 shows a basic circuitry diagram of the third or fourth embodiment.

It should be noted in this connection already that the fourth embodiment differs from the third embodiment in that the fourth embodiment according to FIGS. 7 and 8 includes a laser approximation or reflex arrangement having laser sensors 31, 31a, instead of light barrier 28, 28a, in order to sense a cup size under one of the respective coffee outflow tubes 6, 6a. In FIG. 10, therefore, light barrier contact 30 may also be considered as a laser sensor contact.

The third embodiment and the fourth embodiment, as for the rest, show head contact 22 and foot contact 23 as in the second embodiment.

In the circuitry diagram according to FIG. 10 for the third and the fourth embodiment, the switch-over contacts 26a, 26b of up-down switch 26 of FIG. 9 are quasi replaced by relay switch-over contacts 32, 33 actuated by a relay 34. In the current path of drive motor 24, there is also provided, in series relative to foot contact 23, the light barrier contact or laser sensor contact 30.

Relay 34, i.e. the coil thereof, is series-connected with starter switch 19 for coffee which is manually to be actuated, as well as with sensor contact 29 assigned to cup sensor 27 by means of which the presence of a cup on base 2 is sensed.

Figure 6:
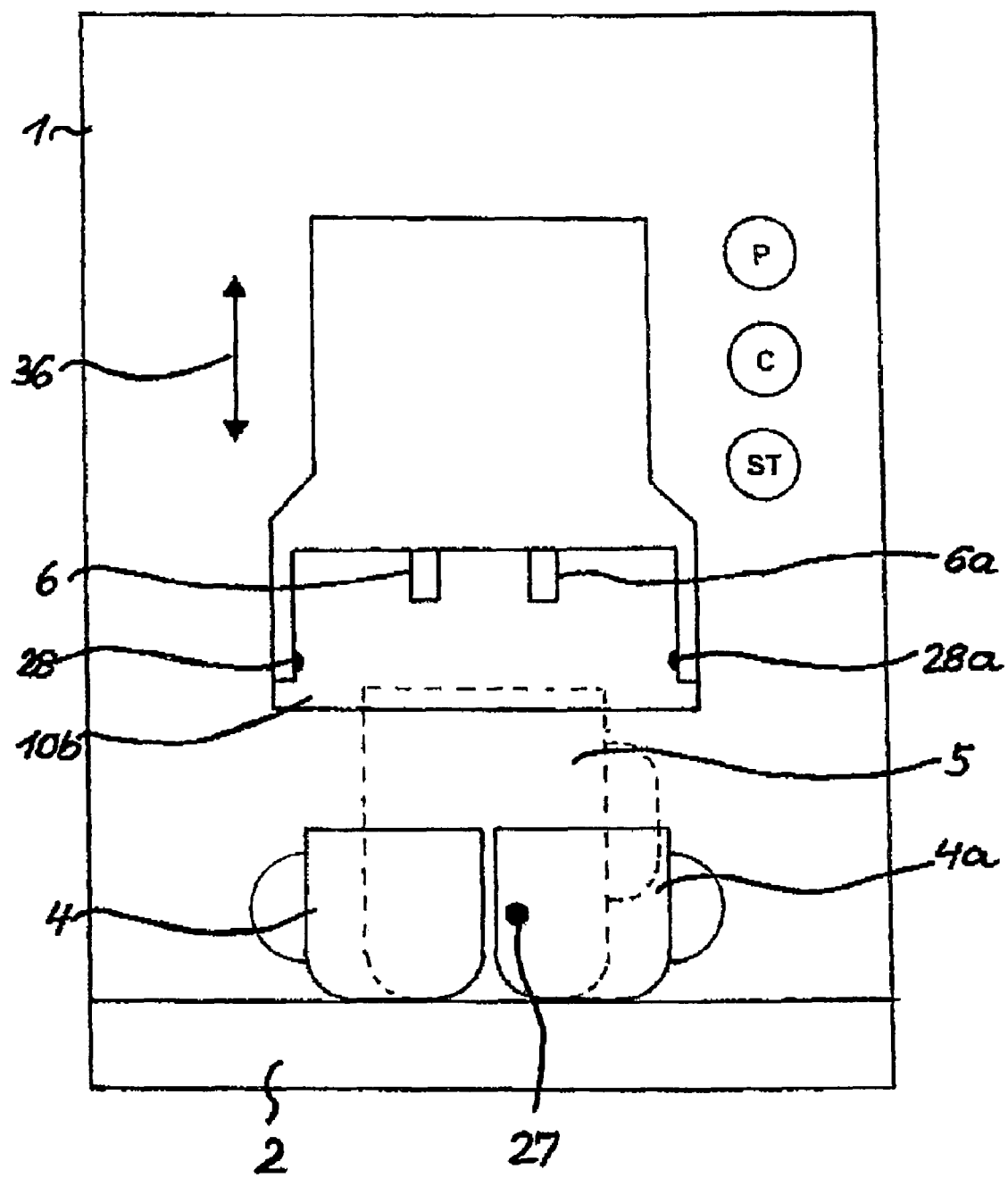
FIG. 6 shows a front view of the third embodiment according to FIG. 5.

The height adjustment of the third embodiment and of the fourth embodiment is also performed as follows:

It is again assumed that, originally, the outflow unit 3a is in its upper end position in which head contact 22 is open und foot contact 23 is closed, compare FIGS. 5, 7 and 10. When actuating mains switch 18, the espresso machine is ready for operation. By means of the cup sensor, it is sensed whether or not a cup is placed underneath outflow unit 3a on base 2, by which sensor contact 29 of FIG. 10 might be closed. If now switch 19 for the coffee brewing process is actuated, this closes the circuit of relay 34, and relay switch-over contacts 32, 33 close a circuit via contacts 23 and 30 so that motor 24 moves outflow unit 3a downward as long until light barrier 28, 28a in FIGS. 5 and 6 is interrupted by the cup, or the cup height is sensed by one of laser sensors 31, 31a in FIGS. 7 and 8. This done, the light barrier contact or laser sensor contact 30 formed as an opener opens and drive motor 24 stops which, via gear means 35, drive pinion 36 and toothed rack 21, locks outflow unit 3a.—The automatic height adjustment is only started by actuating starter switch 19 if cup sensor 27 locates a cup and closes sensor contact 29. In this connection, cup 4, or 5, respectively, may already be underneath outflow unit 3a or may be placed under outflow unit 3a after actuating starter switch 19.

After finishing the brewing process, brew switch 19 is actuated anew whereby the brew water pump is simultaneously switched off so that no brewed coffee can exit from coffee outflow tubes 6, 6a. By opening starter switch 19 for coffee, relay contacts 32, 33 are switched into the position shown in FIG. 10 and current is fed to motor 24 via closed head contact 22 so that motor 24 moves outflow unit 3a upward until, in the upper end position of outflow unit 3a, head contact 22 is opened and the motor stops and hence locks outflow unit 3a.—A downward movement of outflow unit 3a is additionally to, and independently from, the sensing of the cup height is limited by foot contact 23. From the above, it can be taken that head contact 22 and foot contact 23 each prepare the reversal of drive motor 2 which either, according to FIG. 9, is performed via contacts 26 of the up-down switch or, according to FIG. 10, by relay contacts 32 and 33 of relay 34.

The invention claimed is:

1. A coffee automat having a vertically adjustable and lockable outflow unit (3, 3a), which comprises at least one coffee outflow tube (6, 6a) to which a coffee in flow duct (8) leads from a brewing unit, is continuously height adjustable relative to a cup base, and can be locked by a locking means, characterized in that said outflow unit (3, 3a) is supported on a housing (1) by means of a longitudinal ball bearing (12), as a first bearing element, which embraces a vertical longitudinal ball bearing shaft (13, 13a) as a second bearing element, wherein said longitudinal ball bearing shaft (13, 13a) is vertically provided on a carrier (16, 16a) which is connected with said housing (1) of said coffee automat, and that said outflow unit (3, 3a) has an installation chassis (9, 9a, 9b) to which said longitudinal ball bearing (12) is secured.

2. The coffee automat according to claim 1, characterized in that said installation chassis (9, 9a, 9b) includes a vertical wall (10, 10a) on the first side of which said coffee outflow tube 6, 6a) and a section of a coffee inflow duct (8) connected therewith are provided and on the second side of which said longitudinal ball bearing (12) is disposed and the locking means is arranged.

3. The coffee automat according to claim 2, characterized in that from the first side of said installation chassis (9, 9a, 9b) a horizontal wall section projects which carries said coffee outflow tube (6, 6a).

4. The coffee automat according to claim 2, characterized in that a projection (11a) projects from the second side of said installation chassis (9, 9a, 9b), in which projection said longitudinal ball bearing is housed and on which the locking means acts.

5. The coffee automat according to claim 1, characterized in that said installation chassis (9, 9a, 9b) is covered by a cap (17), substantially excepting the side facing said housing (1) of said coffee automat, or the carrier, respectively.

6. The coffee automat according to claim 1, characterized in that said locking means comprises at least two locking elements of which a first locking element is connected with said outflow unit (3, 3a) and a second locking element is provided on a housing (1) of said coffee automat, that one of the two locking elements comprises a holding magnet (15) and that the other of the two locking elements (16) is ferromagnetic.

7. The coffee automat according to claim 6, characterized in that said holding magnet (15) is provided in horizontal direction in a recess (14) of said installation chassis (9) in a limitedly movable manner and that said ferromagnetic locking element (16) provided on the housing is substantially facing said holding magnet (15).

8. The coffee automat according to claim 1, characterized in that on said installation chassis (9a, 9b) a vertical toothed rack (21) is provided which is in gear connection (35) with a drive moor (24) disposed in said housing (1) of said coffee automat, and that said gear connection (35) with said drive motor (24) is self-locking.

9. The coffee automat according to claim 8, characterized in that a driving pinion (36) connected with said drive motor (24) meshes with said toothed rack (21).

10. The coffee automat according to claim 8, characterized in that in an electric circuitry of said drive motor an up-down switch (26) is disposed which is suited to control a height adjustment of said outflow unit (3a) in upward and downward direction.

11. The coffee automat according to claim 10, characterized in that limit switches are provided in the circuitry by means of which said drive motor (24) can be switched off in an upper end position of said outflow unit (3a) mid in a lower end position of said outflow unit (3a) and reversal of the direction of rotation of said drive motor (24) on reaching one of said end positions can be predetermined.

12. The coffee automat according to claim 11, characterized in that said limit switches are provided as head contact (22) and as foot contact (23) in the movement path of said installation chassis (9a, 9b).

13. The coffee automat according to claim 8, characterized in that a displacement encoder is coupled wit said drive motor, which is suited to sense an upper end position and a lower end position of said outflow unit (3a) and reversal of the direction of rotation of said drive motor (24) on reaching one of said end positions can be predetermined.

14. The coffee automat according to claim 8, characterized in that a sensor system is provided on said outflow unit (3a), which is suitable to sense a height of a cup (4, 5) placed underneath said outflow tube and which is so arranged in the circuitry of said drive motor (24) that it switches same off when, on moving said outflow unit (3a), the height of the cup has been sensed.

15. The coffee automat according to claim 14, characterized by a light barrier system (28, 28a) as said sensor system.

16. The coffee automat according to claim 14, characterized by a laser approximation or reflex system (31, 31a) as said sensor system.

17. The coffee automat according to claim 11, characterized in that the circuitry of said drive motor comprises a relay (34) including a starter switch (19) and that in the current path of said drive motor (24) switch-over contacts (32, 33), end contacts (22, 23) and a light barrier contact, or laser sensor contact (30) actuated by said relay (34) are arranged so that by actuating said starter switch (19) and hence pulling said relay (34), said outflow unit (34) moves from an upper end position down to cup height, stops on sensing the cup height by said sensor system (28, 28a; 31, 31a) and hence actuating said light barrier contact, or laser sensor contact (30), and moves back into the upper end position by opening said starter switch (19) when the brewing process has been finished or the cup (4, 5) has been withdrawn.

18. The coffee automat according to claim 17, characterized in that the circuitry arrangement in series with said starter switch (19) includes an additional sensor contact (29) controlled by a sensor (27) which senses the presence of a cup (4, 5) placed underneath said outflow tube (6, 6a).

19. A coffee automat having a vertically adjustable and lockable outflow unit (3, 3a), which comprises at least one coffee outflow tube (6, 6a) to which a coffee in flow duct (8) leads from a brewing unit, is continuously height adjustable relative to a cup base, and can be locked by a locking means, characterized in tat said outflow unit (3, 3a) is supported on a housing (1) by means of a longitudinal ball bearing (12), as a first bearing element, which embraces a vertical longitudinal ball bearing shaft (13, 13a) as a second bearing element, wherein said longitudinal bail bearing shaft (13, 13a) is vertically attached to an installation chassis (9, 9a, 9b) of said outflow unit (3, 3a) and that said longitudinal ball bearing connected with said housing (1) by means of a carrier (16, 16a).

* * * * *